United States Patent
Sone et al.

(10) Patent No.: US 9,473,401 B2
(45) Date of Patent: Oct. 18, 2016

(54) NETWORK SEPARATION METHOD AND NETWORK SEPARATION DEVICE

(71) Applicant: FUJITSU LIMITED, Kawasaki-shi, Kanagawa (JP)

(72) Inventors: Tomoyuki Sone, Yokohama (JP); Kazumine Matoba, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 14/217,843

(22) Filed: Mar. 18, 2014

(65) Prior Publication Data

US 2014/0362866 A1    Dec. 11, 2014

(30) Foreign Application Priority Data

Jun. 11, 2013  (JP) ................................ 2013-123168

(51) Int. Cl.
| | | |
|---|---|---|
| H04L 12/713 | (2013.01) | |
| H04L 12/721 | (2013.01) | |
| H04L 12/64 | (2006.01) | |
| H04L 29/06 | (2006.01) | |

(52) U.S. Cl.
CPC ........... *H04L 45/72* (2013.01); *H04L 12/6418* (2013.01); *H04L 45/586* (2013.01); *H04L 63/0272* (2013.01)

(58) Field of Classification Search
None
See application file for complete search history.

(56) References Cited

U.S. PATENT DOCUMENTS

| | | | |
|---|---|---|---|
| 7,633,909 B1* | 12/2009 | Jones ................. | H04L 63/0272 370/338 |
| 8,112,491 B1* | 2/2012 | Michels ............... | H04L 49/901 709/212 |
| 9,332,426 B2 | 5/2016 | Nishigori | |
| 2003/0214955 A1 | 11/2003 | Kim | |
| 2004/0172528 A1 | 9/2004 | Tenereillo | |
| 2004/0255037 A1 | 12/2004 | Corvari et al. | |
| 2006/0075478 A1* | 4/2006 | Hyndman ........... | H04L 63/0218 726/11 |
| 2006/0271707 A1 | 11/2006 | Cheline et al. | |
| 2008/0148386 A1* | 6/2008 | Kreuk ................. | H04L 63/0272 726/15 |

(Continued)

FOREIGN PATENT DOCUMENTS

| | | |
|---|---|---|
| JP | 11-225154 | 8/1999 |
| JP | 2012-519416 | 8/2012 |

OTHER PUBLICATIONS

Extended European Search Report dated Feb. 25, 2015 in corresponding European Patent Application No. 14179652.4.

(Continued)

*Primary Examiner* — Chi H Pham
*Assistant Examiner* — Soon-Dong D Hyun
(74) *Attorney, Agent, or Firm* — Staas & Halsey LLP (57) ABSTRACT

The network separation device, comprising: a processor configured to perform as a selector, a first relay device and a second relay device; the selector that selects a packet relayed between networks; the first relay device that includes first routing information and outputs to the selector a first packet; the second relay device that includes second routing information and outputs to the selector a second packet, wherein: the selector holds a relay rule of an application layer, selects a first relay packet, and outputs the first relay packet to the second relay device; the second relay device relays the first relay packet to an apparatus registered in the second routing information; the selector selects a second relay packet and outputs the second relay packet to the first relay device; and the first relay device relays the second relay packet to an apparatus registered in the first routing information.

5 Claims, 5 Drawing Sheets

(56) References Cited

U.S. PATENT DOCUMENTS

| | | | |
|---|---|---|---|
| 2008/0305792 A1 | 12/2008 | Khetawat et al. | |
| 2009/0094692 A1 | 4/2009 | Ono et al. | |
| 2010/0218248 A1 | 8/2010 | Nice | |
| 2010/0223319 A1* | 9/2010 | Kamasaka | H04L 12/2818 709/203 |
| 2010/0272115 A1 | 10/2010 | Ramankutty | |
| 2011/0078784 A1* | 3/2011 | Ohtani | H04L 63/0272 726/15 |
| 2011/0286430 A1 | 11/2011 | Zembutsu | |
| 2014/0007222 A1 | 1/2014 | Qureshi et al. | |
| 2014/0129839 A1 | 5/2014 | So et al. | |
| 2014/0169286 A1 | 6/2014 | Xu et al. | |

OTHER PUBLICATIONS

Adrangi et al., "Problem Statement: Mobile IPv4 Traversal of Virtual Private Network (VPN) Gateways", Network Working Group, Aug. 2005, pp. 1-19.

Houseinhand, "Remote Access via VPN Configuration", Intesis Software, May 2011, 25 pp.

United States Office Action dated Mar. 23, 2016 in corresponding U.S. Appl. No. 14/221,705.

United States Office Action dated Aug. 4, 2016 in corresponding U.S. Appl. No. 14/221,705.

U.S. Office Action dated Aug. 21, 2015 in corresponding U.S. Appl. No. 14/221,705.

* cited by examiner

NETWORK SEPARATION METHOD AND NETWORK SEPARATION DEVICE

CROSS-REFERENCE TO RELATED APPLICATION

This application is based upon and claims the benefit of priority of the prior Japanese Patent Application No. 2013-123168, filed on Jun. 11, 2013, the entire contents of which are incorporated herein by reference.

FIELD

The embodiments discussed herein are related to a relay device that relays communications between networks.

BACKGROUND

Service gateways are relay devices that connect networks having different protocols. A relay device connects, for example, a LAN (Local Area Network) and a WAN (Wide Area Network) and relays a packet received from a network on the LAN side or the WAN side to a network including a destination device. A LAN is a network provided in for example an office or the like of a company. The WAN side can serve as an Internet environment. A relay device is used for enabling devices in LANs to perform data communications via the Internet. In a network of a company, security such as a firewall or the like is set in order to prevent unauthorized accesses from outside. By setting a firewall, unauthorized accesses from outside can be prevented.

As a related technique, a technique is known that enhances security by making a relay device disconnect a line of the WAN side when an unauthorized access has been made from a network on the WAN side (see Patent Document 1 for example). Patent Document 1: Japanese Laid-open Patent Publication No. 11-225154

SUMMARY

A device that relays communications between first and second networks is made to operate a selection unit and first and second relay units. The first relay unit outputs, to the selection unit, a packet directed to a device in the second network from the first network. The second relay unit outputs, to the selection unit, a packet directed to a device in the first network from the second network. The selection unit outputs, to the second relay unit, a relay packet selected from among packets input from the first relay unit. The second relay unit relays a first relay packet to a device registered in second routing information representing information related to a device in the second network. The selection unit outputs, to the first relay unit, a second relay packet selected from among packets input from the second relay unit. The first relay unit relays a second relay packet to a device registered in first routing information representing information related to a device in the first network.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

Hereinafter, the present embodiment will be explained in detail by referring to the drawings.

Figure 1:
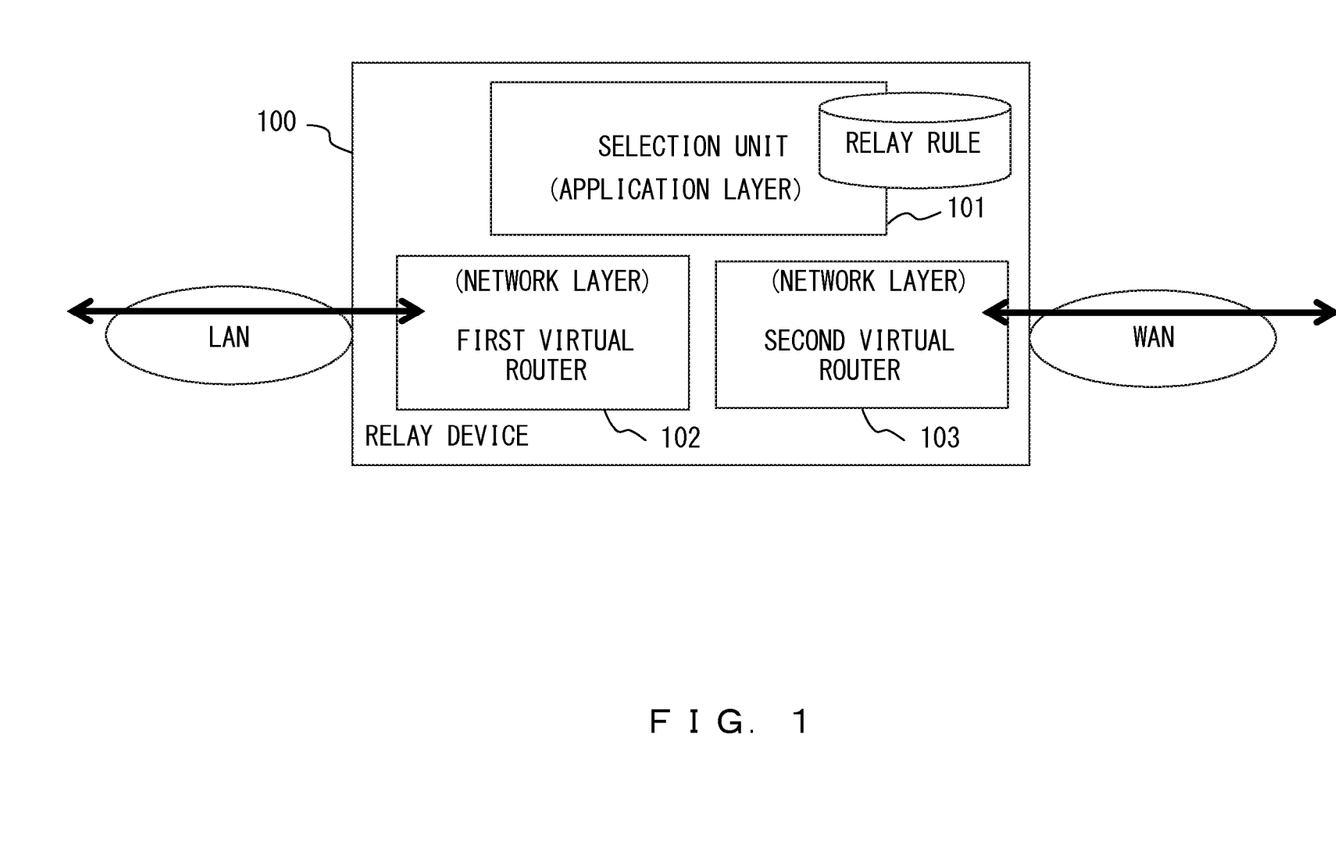
FIG. 1 explains an example of a relay device according to a first embodiment.

FIG. 1 explains an example of a relay device according to a first embodiment. A relay device 100 illustrated in FIG. 1 is a device that functions as a relay device between a LAN side network and a WAN side network. The relay device 100 includes a selection unit 101, a first virtual router 102, and a second virtual router 103. The selection unit 101 is a program that operates on the application layer. The selection unit 101 determines whether or not data that has been input to the first virtual router 102 and the second virtual router 103 may be relayed. The selection unit selects a packet determined to be a relay target, and performs a relay process between the virtual routers. The first and second virtual routers are routers that were generated virtually in the relay device 100 and perform a routing process by using processes on the network layer. The first virtual router 102 transmits and receives packets as an interface with the LAN side. The second virtual router 103 transmits and receives packets as an interface with the WAN side. Accordingly, data input from a LAN side network is received by the first virtual router 102, transferred to the selection unit 101, and, when it is determined to be a relay target, is transmitted to a WAN side network from the second virtual router 103. Data input from a WAN side network is received by the second virtual router 103, transferred to the selection unit 101, and, when it is selected as a relay target by the selection unit, is transmitted to a LAN side network from the first virtual router 102. Data passing through the relay device 100 separates LAN side networks from WAN side networks because of the first and second virtual routers. The selection unit 101 may also be a device that operates virtually.

The relay device 100 is for example a Service Gate Way (SGW), and in the selection unit 101, processes used on the application layer such as protocol conversion of packets of data communication are performed on an as-needed basis. The selection unit 101 extracts information of the destination and the transmission source of data communication. The selection unit 101 has a relay rule, which is a rule for selecting a destination or a transmission source having a particular pattern with respect to the data communication. Information of a destination and a transmission source of a particular pattern is a reliable address, an ID, or the like that is registered in the relay device 100 beforehand. The selection unit 101 selects a reliable destination and a transmission source and relays selected data. The selection unit 101 blocks data that does not comply with the rule.

When data is input to the relay device 100 from a LAN side network, the first virtual router 102 receives data. Processes on the data received by the first virtual router 102 on the network layer are interrupted. The first virtual router 102 transmits the received data to the selection unit 101. The selection unit 101 uses a relay rule so as to select data to be relayed to the WAN side, and transmits the selected data to the second virtual router 103. The second virtual router 103 restarts the processes on the network layer, and outputs data to the WAN side. The selection unit 101 blocks data that does not comply with the rule, and does not transmit data to the second virtual router 103.

When data is input to the relay device 100 from a WAN side network, the second virtual router 103 receives the data. Processes on the data received by the second virtual router 103 on the network layer are interrupted. The second virtual router 103 transmits the received data to the selection unit 101. The selection unit 101 selects data to be relayed to the LAN side by using the relay rule and transmits the selected data to the first virtual router 102. The first virtual router 102 restarts the processes on the network layer, and outputs the data to the LAN side. The selection unit 101 blocks data that does not comply with the rule, and does not transmit data to the first virtual router 102. Thereby, networks on the LAN side and the WAN side are separated so that unexpected data leakage can be avoided. Also, even in data communication directed to a destination not blocked by a firewall, it is possible for the relay device 100 to prevent data communication to an unauthorized transmission destination.

The relay rule used by the selection unit 101 for selecting data is not limited to a rule set by using destinations or transmission sources. For example, the relay rule may be that encrypted data is selected. Also, the relay rule may be that it is checked whether or not a received packet includes personal information. The relay rule may be any rule that is a setting related to security. Further, a plurality of relay rules can be used together. The selection unit 101 having a rule that selects encrypted data transmits data to a virtual router of a relay destination when input data is encrypted. When input data is not encrypted, the selection unit 101 does not transmit data to virtual data of a relay destination. Next, the selection unit 101 having a rule that checks whether personal information is included does not transmit data to a virtual router of a relay destination when personal information is included. The selection unit 101 transmits data to a virtual router of a relay destination when personal information is not included.

Figure 2:
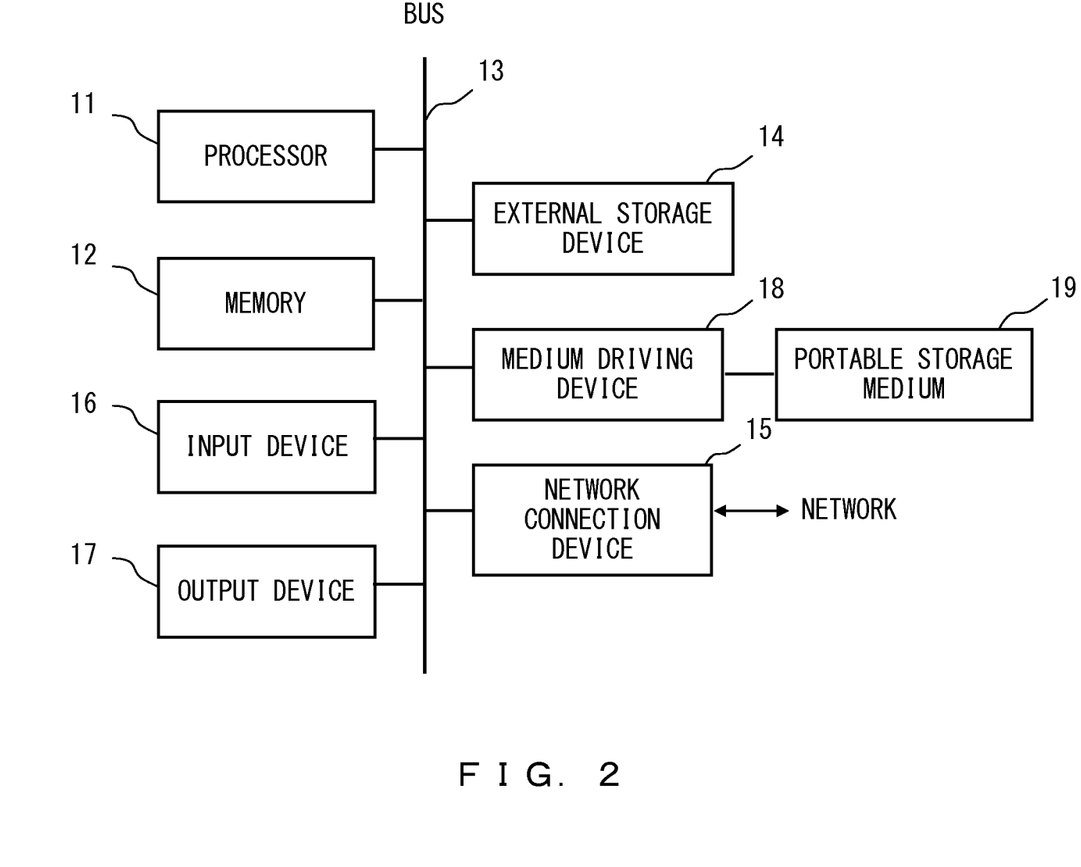
FIG. 2 explains an example of a hardware configuration of the relay device.

FIG. 2 explains an example of a hardware configuration of a relay device. The relay device 100 includes a processor 11, a memory 12, a bus 13, an external storage device 14, and a network connection device 15. Optionally, the relay device 100 may include an input device 16, an output device 17, and a medium driving device 18. The relay device 100 may be implemented by for example a computer or the like.

The processor 11 may be arbitrary processing circuits including a Central Processing Unit (CPU). The processor 11 operates as the selection unit 101, the first virtual router 102, and the second virtual router 103. Also, the processor 11 may execute a program stored in for example an external storage device 14. The memory 12 stores a relay rule used for selecting packets when packets received by the selection unit 101 are relayed. The memory 12 holds routing information held by the first and second virtual routers. Further, the memory 12 also stores data obtained as a result of operations of the processor 11 and data used for processes by the processor 11 on an as-needed basis. The network connection device 15 is used for communications with a different device.

The input device 16 is implemented as for example a button, a keyboard, a mouse, etc., and the output device 17 is implemented as a display device, etc. The bus 13 connects the processor 11, the memory 12, the input device 16, the output device 17, the external storage device 14, the medium driving device 18, and the network connection device 15 so that data can be transmitted and received between them. The external storage device 14 stores a program, data, etc., and provides stored information to the processor 11 or the like on an as-needed basis. The medium driving device 18 may output data of the memory 12 and the external storage device 14 to a portable storage medium 19, and may also read a program, data, etc. from the portable storage medium 19. In this example, the portable storage medium 19 may be an arbitrary portable storage medium including a floppy disk, a Magneto-Optical (MO) disk, a Compact Disc Recordable (CD-R), or a Digital Versatile Disk Recordable (DVD-R).

Figure 3:
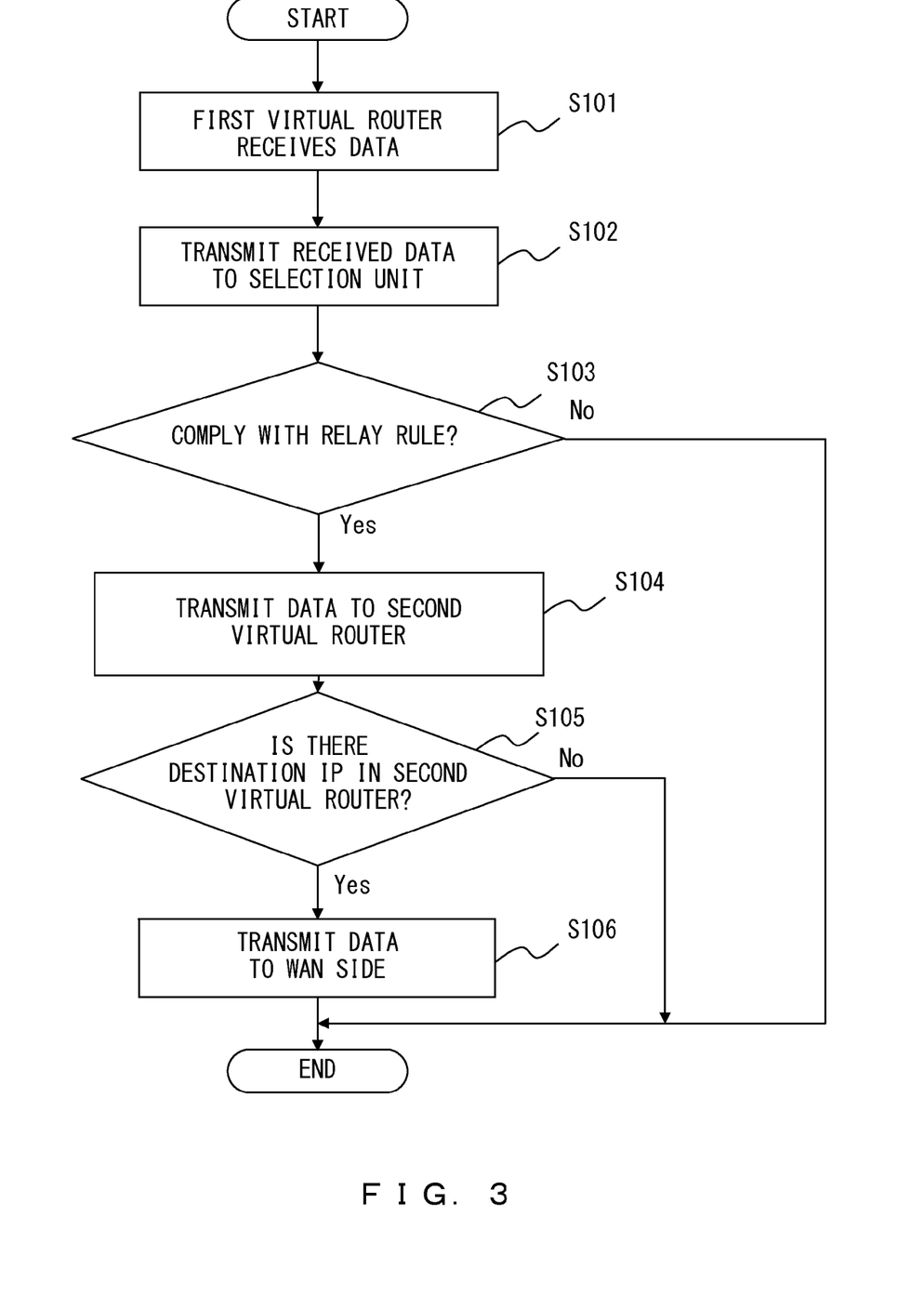
FIG. 3 is a flowchart that explains an example of operations performed when a packet that the relay device received from the LAN side is processed.

FIG. 3 is a flowchart that explains an example of operations performed when a packet that a relay device received from the LAN side is processed. When data has been input to the relay device 100 from the LAN side, the first virtual router 102 receives the data (step S101). The first virtual router 102 transmits the received data to the selection unit 101 (step S102). The selection unit 101 selects data that complies with the relay rule from among pieces of data transmitted from the first virtual router 102 (step S103). In the example of the relay device illustrated in FIG. 3, the relay rule of the selection unit 101 is an address that has been registered beforehand. The selection unit 101 selects data directed to an address specified by the relay rule, and transmits the data to the virtual router. The selection unit 101 transmits the relayed data to the second virtual router 103 (step S104 and YES in step S103). The second virtual router 103 determines whether or not the destination address of the data transmitted from the selection unit 101 is included in routing information that has stored information related to a device on the WAN side (step S105). The second virtual router 103 outputs to the WAN side the data transmitted from the selection unit 101 (step S106). When step S106 is terminated, the relay device terminates the process (NO in step S103 and NO in step S105).

Figure 4:
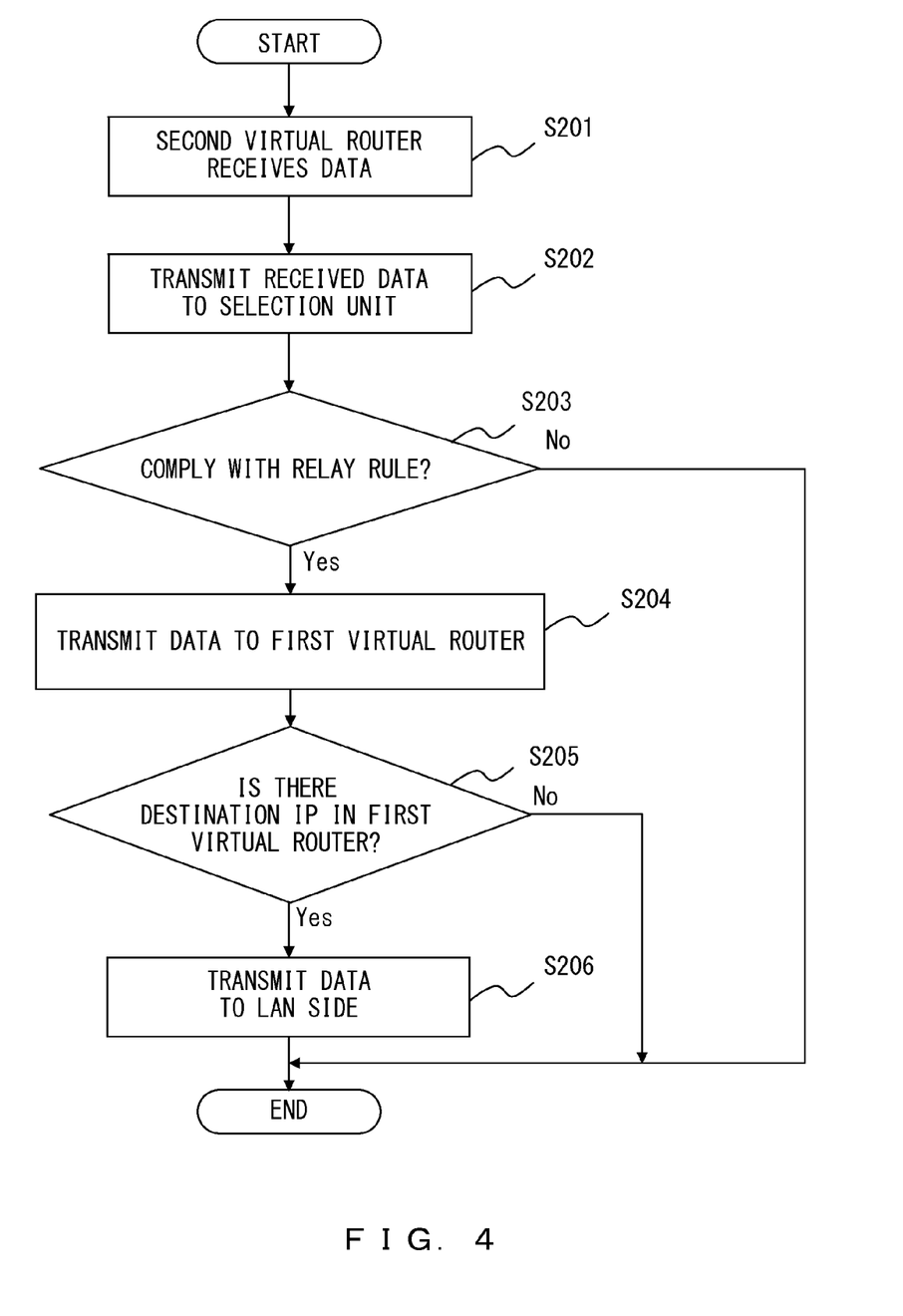
FIG. 4 is a flowchart that explains an example of operations performed when a packet that the relay device received from the WAN side is processed.

FIG. 4 is a flowchart that explains an example of operations performed when a packet that a relay device received from the WAN side is processed. When data has been input to the relay device 100 from the LAN side, the second virtual router 103 receives the data (step S201). The second virtual router 103 transmits the received data to the selection unit 101 (step S202). The selection unit 101 selects data that complies with a set rule from among pieces of data transmitted from the second virtual router 103 (step S203). In the example of the relay device illustrated in FIG. 4, the relay rule of the selection unit 101 is an address that has been registered beforehand. The selection unit 101 selects data directed to an address specified by the relay rule, and transmits the data to the virtual router. The selection unit 101 transmits the relayed data to the first virtual router 102 (step S204 and YES in step S203). The first virtual router 102 determines whether or not the destination address of the data transmitted from the selection unit 101 is included in routing information that has stored information related to a device on the LAN side (step S205). The first virtual router 102 outputs to the LAN side the data transmitted from the selection unit 101 (step S206). When step S206 is terminated, the relay device terminates the process (NO in step S203 and NO in step S205).

As described above, in the method according to an embodiment, networks on the LAN side and the WAN side are separated, making it possible to prevent unexpected leakage of data. Also, even in data communications directed to a destination that is not blocked by a firewall, data communication directed to an unauthorized destination can be prevented by the relay device 100.

<Others>

Note that embodiments are not limited to the above, and may be modified in various manners. Examples of such modifications are described below.

Figure 5:
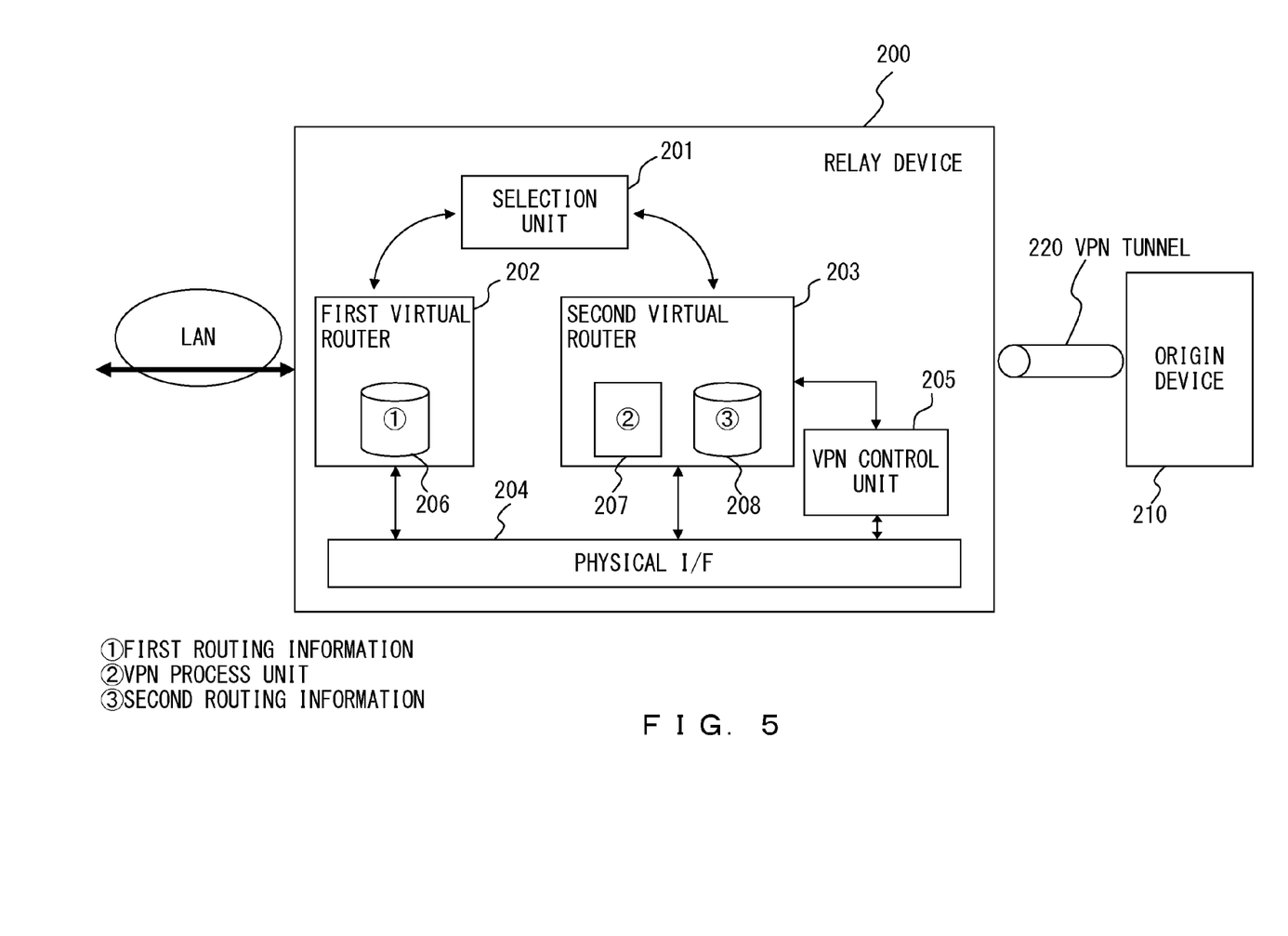
FIG. 5 explains an example of a relay device according to a second embodiment.

FIG. 5 explains an example of a relay device according to a second embodiment. A relay device 200 illustrated in FIG. 5 is a device that functions as a relay device between a LAN side network and a VPN (Virtual Private Network) network on the WAN side. The relay device 200 includes a selection unit 201, a first virtual router 202, a second virtual router 203, a VPN control unit 205, and a physical IF (Interface) 204. The selection unit 201 determines whether or not data that has been input from the first virtual router 202 and the second virtual router 203 may be relayed. The selection unit selects a packet determined to be a relay target, and performs a relay process between the virtual routers. The first and second virtual routers are routers that were generated virtually in the relay device 200. The physical IF 204 is an interface used for performing communication with the LAN side and the WAN side. The first virtual router 202 transmits and receives packets with a LAN side network via the physical IF 204. The first virtual router includes first routing information 206. The first routing information 206 is information in which addresses corresponding to devices connected to a LAN side network and IDs are associated. The second virtual router 203 transmits packets to and receives packets from a WAN side network via the physical IF 204. A WAN side network is connected by a VPN tunnel 220 with an origin device 210, which serves as the origin of the tunnel. The second virtual router 203 includes second routing information 208 and a VPN process unit 207. The second routing information 208 is information in which addresses corresponding to devices connected to a WAN side network and IDs are associated. The VPN process unit 207 processes a packet transmitted to the second virtual router using the VPN. The VPN control unit 205 connects the VPN tunnel 220 and the origin device 210, and controls the process.

Data input from a LAN side network is given to the first virtual router 202, is transferred to the selection unit 201, and, when it is determined as a relay target, is transmitted to a WAN side network from the second virtual router 203. Data input from a WAN side network is given to the second virtual router 203, is transferred to the selection unit 201, and when it is selected as a relay target by the selection unit 201, is transmitted to a LAN side network from the first virtual router 202. Data passing through the relay device 200 separates LAN side networks from WAN side networks by including the first and second virtual routers. The selection unit 201 may also be a device that operates virtually.

The VPN control unit 205 provides the VPN tunnel 220 between the origin device 210 and the relay device 200. The VPN control unit 205 generates a virtual NIC (Network Interface Card) used for the VPN tunnel 220. The VPN control unit 205 assigns an IP address to a virtual NIC that corresponds to the end of the VPN tunnel 220, and registers information related to a virtual NIC as second routing information. It is also possible to employ a configuration in which the origin device 210 assigns an IP address to a virtual NIC. When the origin device 210 has assigned an IP address, the VPN control unit 205 receives information of an IP address assigned by the origin device 210, and registers the information as second routing information. In a network in which the origin device 210 assigns an IP address, the origin device 210 transmits a request signal indicating that it is desired that a VPN tunnels be connected, and an IP address is included in the request signal.

When data has been input to the relay device 200 from a LAN side network, the first virtual router 202 receives the data. The first virtual router 202 transmits the received data to the selection unit 201. The selection unit 201 selects data to be relayed to the WAN side by using the relay rule, and transmits the selected data to the second virtual router 203. The second virtual router 203 performs a process that is necessary for the VPN process unit 207 to output data to the WAN side. The VPN process unit 207 gives the IP address header of the physical IF 204 to an IP address assigned to a virtual NIC. The VPN process unit 207 gives the virtual NIC and the IP address of the physical IF 204 to the data relayed by the selection unit 201. Thereafter, the second virtual router 203 outputs the data to the origin device 210. The selection unit 201 blocks data that does not comply with the rule, and does not transmit data to the second virtual router 203.

The data input to the relay device 200 from the origin device 210 via the VPN tunnel 220 is received by the second virtual router 203. The VPN process unit 207 of the second virtual router 203 deletes the header of the IP address of the physical IF 204 of the received data. The VPN process unit 207 determines whether or not the IP address of the virtual NIC included in the received data is included in the second routing information. When the IP address of the virtual NIC included in the received data is included in the second routing information, the second virtual router 203 receives data from the virtual NIC, and transmits that data to the selection unit 201. The selection unit 201 selects data to be relayed to the LAN side by using the relay rule, and transmits the selected data to the first virtual router 202. The first virtual router 202 outputs the data to the LAN side. The selection unit 201 blocks data that does not comply with the rule, and does not transmit the data to the first virtual router 202. Thereby, networks on the LAN side and the WAN side are separated, making it possible to prevent unexpected leakage of data. Also, even in data communications directed to a destination that is not blocked by a firewall, data communication directed to an unauthorized destination can be prevented by the relay device 200. The relay rule used by the selection unit 201 to select data is the same as that of the selection unit 101.

The relay device 200 has the same hardware configuration as that of the relay device 100. The processor operates as the selection unit 201, the first virtual router 202, the second virtual router 203, and the VPN control unit 205. The memory 12 holds the relay rule, and the first and second routing information, and also stores, on an as-needed basis, data obtained by operations of the processor 11 and data used for processes performed by the processor 11. The network connection device 15 operates as the physical IF 204 and is used for communications with other devices.

A relay device according to the second embodiment performs a connection process for a VPN. The process performed when the relay device according to the second embodiment performs a connection process of a VPN will be described below. The VPN control unit 205 generates a virtual NIC used for the VPN tunnel 220. The VPN control unit 205 assigns an IP address to a virtual NIC that corresponds to the end of the VPN tunnel 220, and registers information related to a virtual NIC in the second routing information. The VPN control unit 205 reports, to the origin device 210, information of a device for which an access is permitted, and makes the origin device 210 store the information. A device for which an access is permitted is a device which belongs to a LAN side network and for which making an access by an operator by using the origin device 210 is permitted. By these operations, the relay device and the origin device are connected via a VPN. The operator can make an access to a LAN side device via the origin device.

Next, a method of reporting information of a device for which an access is permitted in the relay device according to the second embodiment will be explained. The first virtual router 202 receives information related to the device from a LAN side network. The first virtual router 202 transmits the received information to the selection unit 201. The selection unit 201 selects, by using the relay rule, information to be relayed to the WAN side, and transmits the selected data to the second virtual router 203. The VPN process unit 207 determines whether or not information of a virtual NIC that corresponds to the VPN tunnel 220 is included in the second routing information (step S404). When information related to the virtual NIC is included in the second routing information, the VPN process unit 207 gives the header of the IP address of the physical IF 204 to the IP address assigned to the virtual NIC. The second virtual router 203 that gives the virtual NIC and the IP address of the physical IF 204 to the information relayed by the selection unit 201 reports to the origin device 210 information of a device for which an access is permitted. Reporting of information of a device for which an access is permitted is set to be performed periodically.

An example will be explained for a process of transmitting data to a device that belongs to a LAN side network in the relay device according to the second embodiment. The operator specifies a LAN side device to which he or she desires to transmit data, and inputs the data. The origin device 210 determines whether or not the device specified by the operator is a device for which an access is permitted. The origin device 210 determines whether or not a relay device for making an access to the specified device has been connected. The origin device 210 determines a virtual NIC that corresponds to the end of the VPN tunnel 220 for making an access to the specified device. The origin device 210 gives the header of the IP address of the physical IF 204 to the IP address assigned to the virtual NIC. The origin device 210 gives the virtual NIC and the IP address of the physical IF 204 to the data that is to be transmitted. The origin device 210 determines the IP address of the specified device and gives the IP information of the device to the data that is to be transmitted. The origin device 210 transmits, to the relay device 200, the data to be transmitted and the data that was given. The determination processes in steps S504 and S506 use information included in the information of a device that is reported periodically as a device for which an access is permitted.

The second virtual router 203 receives data transmitted from the origin device 210. The VPN process unit 207 of the second virtual router 203 deletes the header of the IP address of the physical IF 204 of the received data. The VPN process unit 207 determines whether or not the IP address of the virtual NIC included in the received data is included in the second routing information. The second virtual router 203 receives the data from the virtual NIC and transmits that data to the selection unit 201. The selection unit 201 selects data to be relayed to the LAN side by using the relay rule and transmits the selected data to the first virtual router 202. The first virtual router 202 transfers the data to a specified device on the LAN side. The process of transmitting data is terminated. The selection unit 201 blocks data that does not comply with the rule, and does not transmit the data to the first virtual router 202. Thereby, networks on the LAN side and the WAN side are separated, making it possible to prevent unexpected leakage of data. Also, even in data communications directed to a destination that is not blocked by a firewall, data communication directed to an unauthorized destination can be prevented by the relay device 200. The relay rule used by the selection unit 201 to select data is the same as that used by the selection unit 101.

All examples and conditional language provided herein are intended for the pedagogical purposes of aiding the reader in understanding the invention and the concepts contributed by the inventor to further the art, and are not to be construed as limitation to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A network separation method used in a relay device including a first virtual router, a second virtual router and a selector, that relays communication between a first network and a second network, the method comprising:
   outputting to the selector a packet directed to an apparatus in the second network from the first network by the first virtual router, that includes first routing information representing information related to an apparatus connected to the first network, the outputting being performed after interrupting processes on a network layer;
   outputting to the selector a packet directed to an apparatus in the first network from the second network by the second virtual router that includes second routing information representing information related to an apparatus connected to the second network, the outputting being performed after interrupting processes on the network layer;
   selecting a first relay packet complying with a prescribed relay rule of an application layer from among packets input from the first virtual router, and outputting the selected packet to the second virtual router by the selector, using a processor;
   relaying the first relay packet to an apparatus registered in the second routing information by the second virtual router;
   selecting a second relay packet complying with the relay rule from among packets input from the second virtual router, and outputting the selected packet to the first virtual router by the selector; and
   relaying the second relay packet to an apparatus registered in the first routing information by the first virtual router.

2. The network separation method according to claim 1, further comprising:
   transmitting, in accordance with the relay rule, a packet including an address that is registered beforehand, an encrypted packet, or a packet not including personal information or any combination thereof by the selector.

3. The network separation method according to claim 1, further comprising:
   connecting an origin apparatus that belongs to the second network and that is an origin of a Virtual Private Network with the second virtual router by a Virtual Private Network by the relay device; and
   when receiving a packet directed to the first network from the origin apparatus, outputting the received packet to the selector by the second virtual router.

4. A network separation device, comprising:
   a processor configured to perform as a selector, a first virtual router and a second virtual router; and a memory configured to store first routing information representing information related to an apparatus connected to the first network, second routing information representing information related to an apparatus connected to the second network, and a relay rule of an application layer;

the processor configured to:
  process a packet relayed between a first network and a second network,
  output to the selector a packet directed to an apparatus in the second network from the first network, after interrupting processes on a network layer;
  output to the selector a packet directed to an apparatus in the first network from the second network, after interrupting processes on the network layer,
wherein:
the selector holds a relay rule of an application layer, selects a first relay packet complying with the relay rule from among packets input from the first virtual router, and outputs the first relay packet to the second virtual router;
the second virtual router relays the first relay packet to an apparatus registered in the second routing information;
the selector selects a second relay packet complying with the relay rule from among packets input from the second virtual router, and outputs the second relay packet to the first virtual router; and
the first virtual router relays the second relay packet to an apparatus registered in the first routing information.

5. The network separation apparatus according to claim 4, wherein:
the selector transmits, in accordance with the relay rule, a packet including an address registered beforehand, an encrypted packet, or a packet not including personal information or any combination thereof.

* * * * *